Nov. 20, 1956     W. E. POLK     2,770,918
ELECTRO-MECHANICAL BIRD DEVICE
Filed June 25, 1953
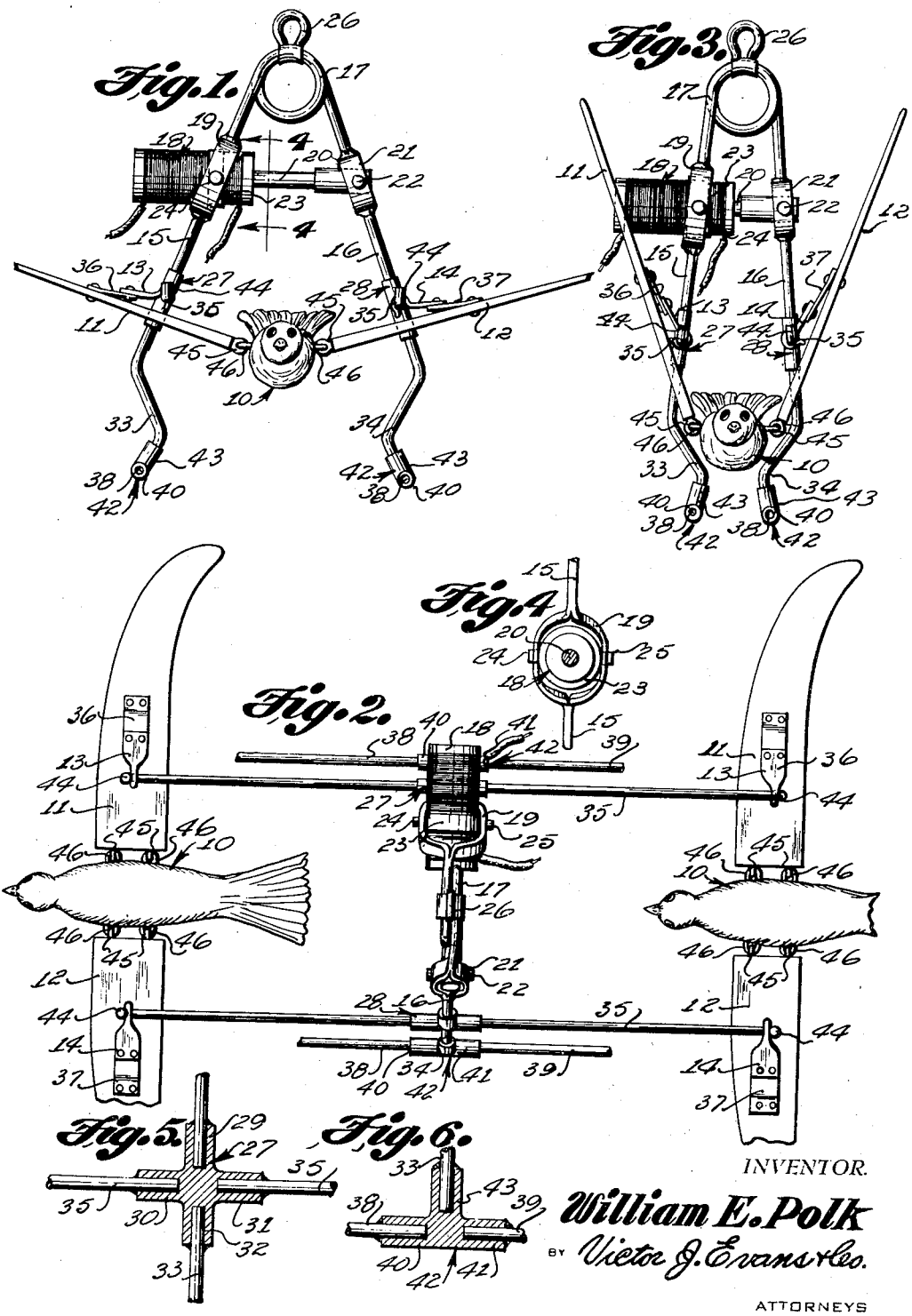
INVENTOR.
William E. Polk
BY Victor J. Evans & Co.
ATTORNEYS

United States Patent Office 2,770,918
Patented Nov. 20, 1956

2,770,918
ELECTRO-MECHANICAL BIRD DEVICE
William Eugene Polk, New York, N. Y.

Application June 25, 1953, Serial No. 364,019

1 Claim. (Cl. 46—245)

This invention relates to power activated toys, and in particular a bird or birds suspended from cam and solenoid actuated arms with the arms pivotally connected to wings of the bird and with the wings pivotally connected to the body of a bird.

The purpose of this invention is to imitate, by mechanical means in a conventional toy a bird in flight wherein an animal or body of an animal is suspended between two points, and wherein the body or elements thereof are actuated by contracting and expending the points from which the animal is suspended.

Various types of mechanical devices have been provided for suspending birds and other animals to provide means for activating parts of the birds or animals, such devices originating in the original toy wherein a monkey was suspended by elastic cords between spring arms and wherein the monkey turned somersaults and was raised and lowered by expanding and contracting the arms. With this thought in mind this invention contemplates a combination of a body suspended between arms with power means for actuating the arms whereby the arms are adapted to be expanded and contracted by electrically operated devices so that the devices may operate continuously.

The object of this invention is, therefore, to provide power means for expanding and contracting arms to which toys or parts thereof may be pivotally connected whereby continuous operation of the arms imparts life or a continuous action to the toy or animal.

Another object of the invention is to provide power actuated arms between which an object may be suspended in which different objects may be suspended between the same arms.

A further object of the invention is to provide power means for expanding and contracting arms upon which a toy or toys may be pivotally mounted for actuating the toy in which the device is of a simple and economical construction.

With these and other objects and advantages in view the invention embodies pairs of arms pivotally or resiliently connected with electrically actuated devices operatively connected to the arms for spreading and contracting the arms.

Other features and advantages of the invention will appear from the following description taken in connection with the drawings, wherein:

Figure 1 is an elevational view illustrating a pair of solenoid actuated arms suspended from a hanger with the wings of a bird pivotally connected to the arms and wherein the wings are pivotally connected to the body of a bird.

Figure 2 is a plan view of the device shown in Fig. 1 with parts broken away and illustrating a pair of birds carried by extended ends of arms with parallel rods and the like.

Figure 3 is an end elevational view, similar to that shown in Fig. 1 showing the device with the arms contracted.

Figure 4 is a detail taken on line 4—4 of Fig. 1 showing a typical connection of a solenoid to an arm of the device, wherein the solenoid is pivotally mounted in a yoke in the intermediate part of one of the arms.

Figure 5 is a detail showing a cross section through a cross-fitting for connecting vertical and horizontally disposed rods.

Figure 6 is a similar detail showing a T-fitting for connecting a horizontally disposed rod and a vertical rod.

Referring now to the drawings wherein like reference characters denote corresponding parts the power actuated toy particularly as illustrated in Figs. 1, 2, and 3, includes a body 10 having wings 11 and 12 secured by hooks 13 and 14, respectively to arms 15 and 16 extended from a spring coil 17 and a solenoid 18 pivotally mounted in a yoke 19 on the arm 15 and positioned to influence a core 20 pivotally mounted in a yoke 21 in the arm 16 with pins 22.

The solenoid 18 is provided with a surrounding band 23 and pins 24 and 25, extended from opposite sides of the band provide pivotal mounting elements in the sides of the yoke 19, as illustrated in Fig. 4.

The coil 17 is provided with a hanger 26 by which the device may be suspended from a chain or stand and as electricity is intermittently supplied to the solenoid 18 the arms 15 and 16 are drawn together by the solenoid and expanded by the spring of the coil 17.

The arms 15 and 16 are provided with cross-fittings 27 and 28 which, as illustrated in Fig. 5, are provided with upwardly extended hubs 29 in which the arms 15 and 16 are mounted, horizontally disposed hubs 30 and 31 in which rods may be mounted for carrying birds, and hubs 32 in which depending sections 33 and 34 are mounted, as shown in Fig. 1.

With the parts as illustrated in Fig. 1, pins or rods, as indicated by the numeral 35 may be extended from the hubs 30 and 31 for receiving the hooks 13 and 14 and with the hooks secured to the wings 11 and 12 with mounting links 36 and 37, respectively the wings will be pivotally connected to the arms. It will be understood that a similar bird with similarly positioned wings may be suspended below the bird 10 with the hooks 13 and 14 attached to pins, such as pins 38 and 39 which are mounted in hubs 40 and 41, respectively of a T-fitting 42 on the lower end of each of the sections 33 and 34, the lower ends of which extend into hubs 43, as shown in Fig. 6.

As illustrated in Fig. 2, the pins 35, extended from the hubs 30 and 31 are elongated and ends 44 thereof are turned upwardly to provide means for retaining the hooks on the wings of the bird thereon.

The inner ends of the wings are provided with eyes 45 which extend through eyes 46 on the sides of the birds 10 whereby the birds are pivotally connected to the wings.

It will be understood that the sections 33 and 34 may be omitted with only one pair of birds being suspended by the arms and it will also be understood that the pins or rods 35 may be comparatively short whereby only one bird may be suspended at the center or between the arms 15 and 16.

In the different designs the expanding or spreading action of the arms causes the wings of the birds to spread to substantially horizontally disposed positions and the contracting action causes the wings to extend upwardly as shown in Figure 3 and with the parts actuating continuously the wings of the birds move upwardly and downwardly imitating birds in flight.

It will be understood that other modifications, within the scope of the appended claim, may be made in the design and arrangement of the parts without departing from the spirit of the invention.

What is claimed is:

In a power actuated toy, a body, a pair of wings pivotally connected to said body, links secured to the upper surface of said wings, hooks connected to said links, a spring coil having arms extended therefrom, a yoke on each of said arms, a solenoid, a band surrounding said solenoid, pins extending from opposite sides of the band and pivotally mounted in one of said yokes, said solenoid adapted to have electricity applied intermittently thereto, a core pivotally mounted in the other yoke and projecting into said solenoid, a hanger extending upwardly from said coil, cross fittings including vertically disposed hubs connected to said arms, and said cross fittings further including horizontally disposed hubs, rods extending from said horizontally disposed hubs and connected to the hooks on said links, end portions of said rods extending transversely to define hook members for retaining said rods connected to the hooks on said links.

References Cited in the file of this patent

UNITED STATES PATENTS

| | | |
|---|---|---|
| 1,239,040 | Radkoff | Sept. 4, 1917 |
| 1,782,042 | Kunkel | Nov. 18, 1930 |
| 2,576,209 | Berger | Nov. 27, 1951 |
| 2,637,937 | Polk | May 12, 1953 |
| 2,637,938 | Polk | May 12, 1953 |

FOREIGN PATENTS

| | | |
|---|---|---|
| 447,966 | Germany | Aug. 4, 1927 |
| 299,742 | Great Britain | Oct. 26, 1928 |